Oct. 31, 1950 — C. E. WILSON — 2,527,610
MOWER ATTACHMENT FOR AUTOMOBILES
Filed Aug. 6, 1945 — 3 Sheets-Sheet 1

INVENTOR.
Charles E. Wilson
BY Victor J. Evans & Co.
ATTORNEYS

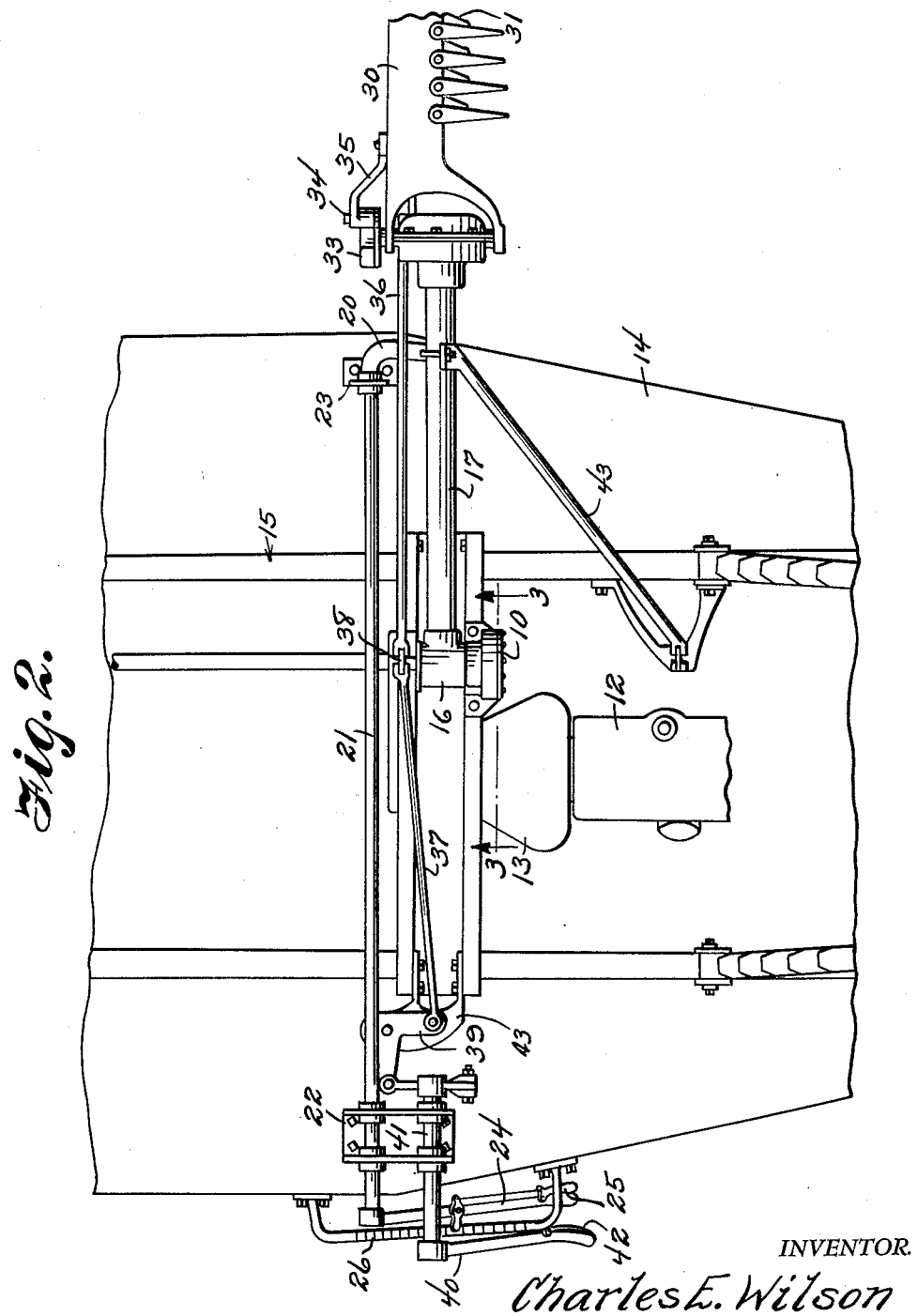

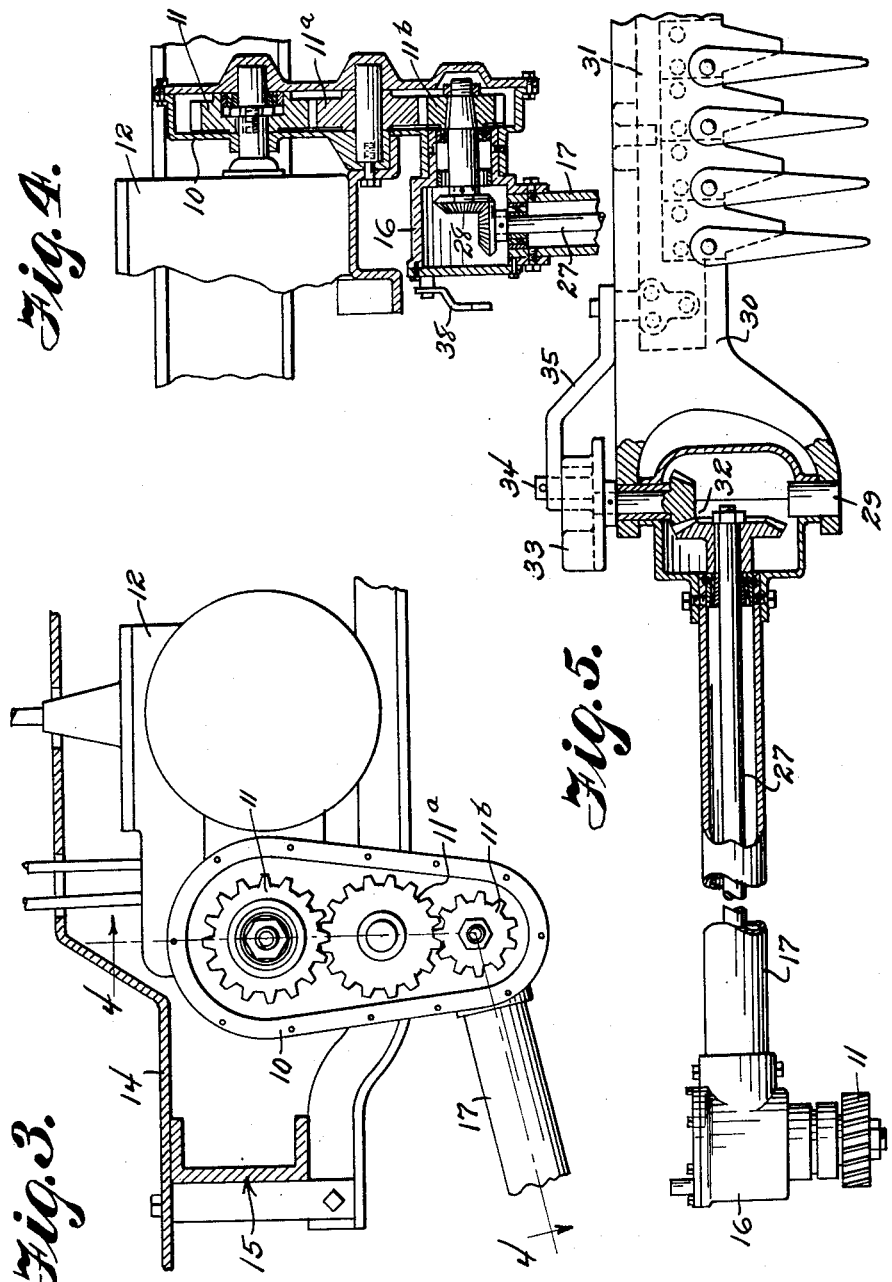

Patented Oct. 31, 1950

2,527,610

UNITED STATES PATENT OFFICE 2,527,610

MOWER ATTACHMENT FOR AUTOMOBILES

Charles E. Wilson, Petersburg, Va.

Application August 6, 1945, Serial No. 609,229

2 Claims. (Cl. 56—25)

The invention relates to a grass mowing attachment, and more especially, to this type of attachment for a motor vehicle.

The primary object of the invention is the provision of an attachment of this character, wherein a sickle cutter bar is driven directly from the engine within a motor vehicle, such as a truck or the like, and is serviceable for farm work or other similar jobs, the attachment being of novel construction, and is unique in the equipment, it being readily and easily controlled and will cut long or short grass, weeds or the like through power transmitted thereto from the power unit of the vehicle.

Another object of the invention is the provision of an attachment of this character, wherein it is designed particularly for service with Jeeps, and is mounted thereon with ease and dispatch, and is also removable in a like manner, so that the vehicle can be used for miscellaneous purposes, and for the mounting of the attachment to the vehicle there being no changes required in the original set-up, that is to say, the chassis frame and motive unit installed therein.

A further object of the invention is the provision of an attachment of this character, which is simple in construction, thoroughly reliable and efficient in operation, strong, durable, having maximum cutting speed, susceptible of adjustment to working and non-working positions, possessed of long range driving, one man controlled, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings—

Figure 2 is a fragmentary bottom plan view thereof.

Figure 3 is an enlarged fragmentary sectional view through the train of gearing from the motor unit of the vehicle to the attachment substantially along line 3—3 of Figure 2.

Figure 4 is a sectional view taken on the line 4—4 of Figure 3 looking in the direction of the arrows.

Figure 5 is a fragmentary plan view, partly broken away of the sickle bar connections for the driving thereof.

Similar reference characters indicate corresponding parts throughout the several views in the drawings.

Figure 1:
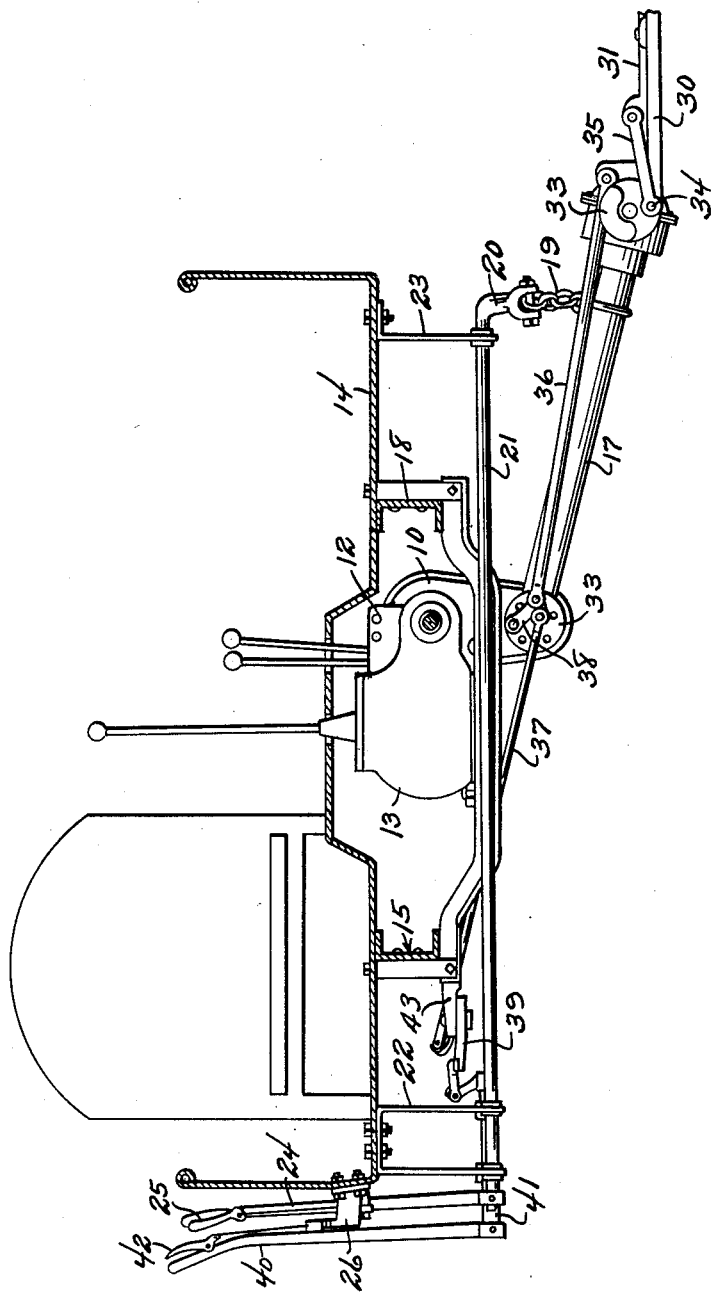
Figure 1 is a vertical transverse sectional view through a motor vehicle, showing the attachment constructed in accordance with the invention applied thereto.

Referring to the drawings in detail, the attachment constructed in accordance with the invention, comprises a gearing casing or housing 10, which is of a size to contain a train of driven gears 11, 11a and 11b constituting a transmission for power from the engine 12 installed within a vehicle, only a portion of the latter being shown, to the attachment. This casing or housing 10 is made fast to the transmission box 13 of the engine 12 in any suitable manner to vertically depend beneath the flooring to a truck body 14, and its supporting chassis 15, only a portion of these being disclosed.

United with this casing or housing 10 is the detachable coupling head 16 of a shaft tubing 17, which extends laterally at an outward inclination beneath the chassis frame 18 to one side of the vehicle body 14, and such shaft tubing 17 can be manually raised or lowered by a chain connection 19, on a crank 20 of a lift rod 21 having bearing in hangers 22 and 23, respectively, suspended from the chassis frame, the rod being fitted with a throw lever 24, provided with a manually operated latch 25 co-acting with a segment shaped tooth keeper 26 on the body 14 and in convenient reach of the operator of the vehicle therein.

Within the tubing 17 is a driven shaft 27 which has beveled gear connections 28 within the coupling head 16, and hinged at 29 to the outer end of this tubing 17 is a sickle bar guide 30, fitted with a reciprocating sickle cutting bar 31, the shaft 27 being operatively connected with such bar 31 by beveled gear connections 32 actuating wrist-pin eccentric 33, having its wrist pin 34 linked at 35 to the said bar 31 for the reciprocation of the latter for grass cutting purposes.

The guard 30 has connected thereto a lifter rod 36, which through the throw arm 37 pivoted to the head 16, together with a link 38 and bell crank 39, is raised and lowered manually from an operating lever 40, its arbor 41 being journaled in the hanger 22 and is provided with a hand release latch 42 co-acting with the keeper 26, as best seen in Figure 2 of the drawings.

The tubing 17 is braced by a flexible tie hanger 43 connected to the same and the chassis frame of the vehicle.

The attachment in its entirety is built for detachment from the vehicle, so that the latter can be used with or without the same, and when without can be employed for various purposes common to vehicles of this type. In the attaching and detaching of the attachment to and from the vehicle, there is required no change in the structural make-up of the latter for this purpose, excepting that the side guards, not shown, necessarily have to be removed. To accomplish the detachment of the unit from the vehicle, it is only necessary to detach the casing 10 from the transmission box 13, detach the hangers 22 and 23 from the chassis 15, detach the segment tooth keeper 26 and a supporting bracket 43 likewise from the frame or chassis 15, whereupon the unit may be entirely removed from the vehicle.

The attachment in the working thereof is quick cutting, and is one man controlled, it being positive in action and possesses strength and durability, as well as readily and easily controlled. The attachment when not in actual use can be elevated from a working position on the vehicle, and is latched in this position until service is required thereof.

What is claimed is:

1. A grass mowing attachment for a vehicle including a bottom chassis frame and an engine, comprising a housing secured to the bottom of said frame, a tube arranged below said frame and projecting beyond the latter, a driven shaft mounted in said tube, gearing arranged in said housing for connecting one end of said driven shaft to said engine, a sickle bar guide swingably connected to the other end of said tube, a chain having one end connected to said tube, a lift rod provided with a crank connected to the other end of said chain, hangers for dependingly supporting said lift rod from said chassis frame, a throw lever for moving said lift rod, a cutting bar reciprocably connected to said sickle bar guide, an eccentric mounted on said tube, a link connecting said eccentric to said cutting bar, and means connecting said eccentric to said driven shaft.

2. A grass mowing attachment for a vehicle including a bottom chassis frame and an engine, comprising a housing secured to the bottom of said frame, a tube arranged below said frame and projecting beyond the latter, a driven shaft mounted in said tube, gearing arranged in said housing for connecting one end of said driven shaft to said engine, a sickle bar guide swingably connected to the other end of said tube, a chain having one end connected to said tube, a lift rod provided with a crank connected to the other end of said chain, hangers for dependingly supporting said lift rod from said chassis frame, a throw lever for moving said lift rod, a cutting bar reciprocably connected to said sickle bar guide, an eccentric mounted on said tube, a link connecting said eccentric to said cutting bar, means connecting said eccentric to said driven shaft, and a lifter rod connected to said sickle bar guide.

CHARLES E. WILSON.

REFERENCES CITED

The following references are of record in the file of this patent:

UNITED STATES PATENTS

| Number | Name | Date |
|---|---|---|
| 2,060,280 | Clapper | Nov. 10, 1936 |
| 2,098,948 | Foushes et al. | Nov. 16, 1937 |
| 2,129,435 | Morris | Sept. 6, 1938 |
| 2,187,981 | Martin | Jan. 23, 1940 |
| 2,291,987 | Rogers | Aug. 4, 1942 |
| 2,304,421 | Rogers | Dec. 8, 1942 |
| 2,335,510 | Hansen | Nov. 30, 1943 |

FOREIGN PATENTS

| Number | Country | Date |
|---|---|---|
| 579,698 | Germany | July 4, 1933 |